United States Patent
Abbiati et al.

(10) Patent No.: US 9,383,535 B2
(45) Date of Patent: Jul. 5, 2016

(54) OPTICAL TERMINATION ASSEMBLIES

(75) Inventors: Fabio Abbiati, Milan (IT); Ian James Griffiths, Milan (IT); Arnaud Le Dissez, Milan (IT)

(73) Assignee: PRYSMIAN S.p.A., Milan (IT)

( * ) Notice: Subject to any disclaimer, the term of this patent is extended or adjusted under 35 U.S.C. 154(b) by 10 days.

(21) Appl. No.: 13/518,286

(22) PCT Filed: Dec. 23, 2009

(86) PCT No.: PCT/EP2009/067852
§ 371 (c)(1),
(2), (4) Date: Sep. 13, 2012

(87) PCT Pub. No.: WO2011/076275
PCT Pub. Date: Jun. 30, 2011

(65) Prior Publication Data
US 2013/0004125 A1    Jan. 3, 2013

(51) Int. Cl.
G02B 6/36    (2006.01)
G02B 6/44    (2006.01)

(52) U.S. Cl.
CPC ............ *G02B 6/4441* (2013.01); *G02B 6/4454* (2013.01)

(58) Field of Classification Search
CPC .................................... G02B 6/36; G02B 6/46
USPC ..................................................... 385/77, 92
See application file for complete search history.

(56) References Cited

U.S. PATENT DOCUMENTS

| | | | | |
|---|---|---|---|---|
| 5,007,860 A * | 4/1991 | Robinson et al. | .......... | 439/540.1 |
| 5,067,784 A * | 11/1991 | Debortoli et al. | ............... | 385/53 |
| 5,071,211 A * | 12/1991 | Debortoli et al. | ............... | 385/76 |
| 5,100,221 A * | 3/1992 | Carney et al. | ................. | 385/135 |
| 5,138,688 A * | 8/1992 | Debortoli | ....................... | 385/135 |
| 5,167,001 A * | 11/1992 | Debortoli et al. | ............. | 385/135 |
| 5,339,379 A * | 8/1994 | Kutsch et al. | ................... | 385/135 |
| 5,349,146 A * | 9/1994 | Radabaugh | .................. | 200/61.6 |
| 5,408,570 A * | 4/1995 | Cook et al. | ..................... | 385/134 |
| 5,434,944 A * | 7/1995 | Kerry et al. | .................... | 385/135 |
| 5,631,993 A * | 5/1997 | Cloud et al. | ................... | 385/135 |
| 5,647,045 A * | 7/1997 | Robinson et al. | ............. | 385/135 |

(Continued)

FOREIGN PATENT DOCUMENTS

EP    0744640 A1    11/1996
WO    WO-02/06879 A1    1/2002

OTHER PUBLICATIONS

International Search Report.

*Primary Examiner* — Kaveh C Kianni
(74) *Attorney, Agent, or Firm* — Harness, Dickey & Pierce, P.L.C.

(57) ABSTRACT

An optical termination assembly may include an optical termination box and a drop cable. The drop cable may have a first end housed in a first compartment of the optical termination box. The first end of the drop cable may be pre-connectorized. The optical termination box may include at least one first fixing element accessible from an outside of the optical termination box suitable for fixing the optical termination box to a support structure. An optical termination assembly may include an optical termination box and a drop cable including a plurality of optical fibers. The drop cable may have a first end housed in a first compartment of the optical termination box. At the first end of the drop cable, each of the plurality of optical fibers may be connected to a respective optical connector. The optical termination box may include the at least one first fixing element.

18 Claims, 5 Drawing Sheets

(56) References Cited

U.S. PATENT DOCUMENTS

| | | | |
|---|---|---|---|
| 5,781,686 A * | 7/1998 | Robinson et al. | 385/135 |
| 5,790,741 A | 8/1998 | Vincent et al. | |
| 5,862,290 A * | 1/1999 | Burek et al. | 385/135 |
| 6,249,633 B1 * | 6/2001 | Wittmeier et al. | 385/135 |
| 6,385,381 B1 * | 5/2002 | Janus et al. | 385/135 |
| 6,556,763 B1 * | 4/2003 | Puetz et al. | 385/135 |
| 6,573,455 B1 | 6/2003 | Radelet | |
| 6,760,531 B1 * | 7/2004 | Solheid et al. | 385/135 |
| 7,493,003 B2 * | 2/2009 | Kowalczyk et al. | 385/135 |
| 7,709,733 B1 * | 5/2010 | Plankell | 174/50 |
| 8,488,934 B2 * | 7/2013 | Zhou et al. | 385/135 |
| 8,520,996 B2 * | 8/2013 | Cowen et al. | 385/135 |
| 2003/0174996 A1 * | 9/2003 | Henschel et al. | 385/135 |
| 2004/0110468 A1 * | 6/2004 | Perlman | 455/13.3 |
| 2006/0083475 A1 * | 4/2006 | Grubish et al. | 385/135 |
| 2006/0222309 A1 * | 10/2006 | Grubish et al. | 385/135 |
| 2006/0269204 A1 * | 11/2006 | Barth et al. | 385/135 |
| 2007/0237484 A1 | 10/2007 | Reagan et al. | |
| 2008/0011514 A1 * | 1/2008 | Zheng et al. | 174/72 R |
| 2008/0124038 A1 * | 5/2008 | Kowalczyk et al. | 385/135 |
| 2008/0264664 A1 * | 10/2008 | Dinh et al. | 174/50 |
| 2008/0279521 A1 * | 11/2008 | Kowalczyk et al. | 385/135 |
| 2009/0060441 A1 | 3/2009 | Kowalczyk et al. | |
| 2009/0074370 A1 | 3/2009 | Kowalczyk et al. | |
| 2009/0097813 A1 * | 4/2009 | Hill | 385/135 |
| 2009/0110359 A1 * | 4/2009 | Smith et al. | 385/135 |
| 2009/0202214 A1 * | 8/2009 | Holmberg et al. | 385/135 |
| 2009/0238531 A1 * | 9/2009 | Holmberg et al. | 385/135 |
| 2009/0245743 A1 * | 10/2009 | Cote et al. | 385/135 |
| 2009/0263097 A1 * | 10/2009 | Solheid et al. | 385/135 |
| 2009/0324189 A1 * | 12/2009 | Hill et al. | 385/135 |
| 2010/0142910 A1 * | 6/2010 | Hill et al. | 385/135 |
| 2010/0183274 A1 * | 7/2010 | Brunet et al. | 385/135 |
| 2010/0197222 A1 * | 8/2010 | Scheucher | 455/11.1 |
| 2010/0247053 A1 * | 9/2010 | Cowen et al. | 385/135 |
| 2011/0019964 A1 * | 1/2011 | Nhep et al. | 385/135 |

* cited by examiner

OPTICAL TERMINATION ASSEMBLIES

CROSS-REFERENCE TO RELATED APPLICATION(S)

This application is a national stage entry from International Application No. PCT/EP2009/067852, filed on Dec. 23, 2009, in the Receiving Office of the European Patent Office, the entire contents of which are incorporated herein by reference.

TECHNICAL FIELD

The present invention relates to the field of optical access networks. In particular, the present invention relates to an optical termination assembly, the optical termination assembly including an optical termination box and a drop cable. Furthermore, the present invention relates to a method for installing an optical termination assembly.

BACKGROUND ART

FTTH (Fiber To The Home) network is an optical access network providing a number of end users with communication services, e.g. with services requiring data transmission at a rate of some hundreds of Mbit/s or more.

Typically, FTTH network comprises a distribution cabinet located in the basement of the building where the end users reside and an optical cable (that is usually termed "in-line cable" or "riser cable") exiting the distribution cabinet. Typically, the in-line cable vertically runs through the building from the basement up to all the building floors.

At each floor of the building, one or more optical cables (usually termed "drop cables") may branch off from the in-line cable. The optical connection between the in-line cable and the one or more drop cables is typically made within a so-called optical transition box. Accordingly, each drop cable has an end optically connected to the in-line cable within the optical transition box. The opposite end of the drop cable is connectorized, i.e. at least one optical fiber of the drop cable is connected to a respective optical connector. The connectorized end of the drop cable is typically housed in an optical termination box located in the apartment of an end user. The optical termination box has openings allowing the end user to easily access the optical connectors and connect to them one or more end user equipments (e.g. an Optical Network Termination like a set-top-box, etc.) for accessing the communication services provided by the FTTH network.

Alternatively, the drop cables may directly exit the distribution cabinet. In that case, the FTTH network comprises neither an in-line cable nor an optical transition box. Each drop cable runs through the building from the basement directly up to the apartment of an end user. The end of the drop cable located in the apartment is connectorized and housed in an optical termination box.

U.S. Pat. No. 5,647,045 describes a multi-media connection housing. The housing receives a fiber cable. The fiber cable has four optical fibers, each being attached via an optical connector to an adapter, such as ST, SC or FC adapter. The housing includes a base plate that is mountable on a wall surface or the like adjacent to a portion from which a fiber cable extends. The housing includes a cover that is removably connected to the base plate to define a substantially enclosed interior area. When optical fibers extend to the housing in a surface mounted conduit or the like in the office or home, the cables enter the interior area of the housing through breakout raceway openings in a selected side of the cover. Further, the baseplate has a cable access aperture. The cable access aperture is sized to receive the optical fibers therethrough, for example when the base plate is mounted to a wall surface or the like over a conventional electric box within the wall that receives telecommunication cables routed through the wall.

The Applicant has noticed that the multimedia connection housing described by U.S. Pat. No. 5,647,045 (that is basically an optical termination box) has some drawbacks.

Indeed, for installing one of these optical termination boxes in the apartment of an end user, an operator should lay down a drop cable from the optical transition box (or from the distribution cabinet, in case the drop cable directly exits the distribution cabinet) to the apartment of the end user within a suitable duct. In the apartment of the end user, the operator should cut the drop cable to a suitable length and connect its optical fibers (e.g. by means of optical fiber splices) to respective optical connectors. Then, the operator should arrange the extra-length of the optical fibers, the optical fiber splices and the optical connectors in the optical termination box. The optical termination box is then fixed to a wall of the apartment. To this purpose, the operator should usually drill a suitable number of holes in the wall, and then fix the base of the optical termination box to the wall by means of screws or other fastening elements. Finally, the operator should remove one of the raceway breakouts from the side of the cover for allowing passage of the drop cable, and close the optical termination box by applying the cover onto the base plate.

Therefore, installing one of the above known optical termination boxes disadvantageously requires performing a number of operations within the apartment of the end user. Accordingly, the installation time within the apartment of the end user is disadvantageously long (typically, about half an hour). The installation may then be inconvenient for the end user.

Further, making optical fibers splices and handling optical fibers, optical fiber splices and optical connectors for arranging them on the base are critical steps that should be performed by a skilled operator. Indeed, optical fibers, optical fiber splices and connectors are very delicate, and they should be accordingly handled very carefully. If the operator is not skilled or not careful enough, he may disadvantageously damage them during installation.

The risk of damaging the content of the optical termination box is even higher while the operator drills the holes and fixes the base plate to the wall. For instance, the operator may inadvertently break an optical fiber splice or pierce an optical fiber while he screws the base to the wall. Further, dust and/or wall fragments produced while the operator drills the holes may fall onto the base, and may damage the optical fibers, the optical fiber splices or the optical connectors arranged on the base.

SUMMARY OF THE INVENTION

In view of the above, the Applicant has tackled the problem of providing an optical termination assembly comprising an optical termination box and a drop cable, which overcomes the aforesaid drawbacks.

In particular, the Applicant has tackled the problem of providing an optical termination assembly comprising an optical termination box and a drop cable, whose installation requires a minimum number of steps to be performed by the operator in the apartment of the end user, and that allows minimizing the risk of damaging the content of the optical termination box during installation.

The Applicant has found that the above problem may be solved by an optical termination assembly comprising an optical termination box and a drop cable having a first end housed in a compartment of the optical termination box, wherein the first end of the drop cable is pre-connectorized, and wherein the optical termination box comprises at least one fixing element accessible from the outside and suitable for fixing the optical termination box to a support structure (e.g. a portion of a wall or a DIN rail)

In this manner the termination box can be mounted without opening the compartment.

In the present description and in the claims, the expression "the first end of the drop cable is pre-connectorized" indicates that, at the first end of the drop cable housed in the optical termination box, at least one optical fiber of the drop cable is connected to an optical connector, the operation of connecting the at least one optical fiber to the optical connector being typically performed by the manufacturer that assembles the optical termination assembly. Successively, the manufacturer closes (and possibly seals) the optical termination box and sells it to network operators for successive installation in apartments of end users.

When an end user requests to access the FTTH network available in the building where she/he resides, the optical termination assembly (i.e. the sealed optical termination box with the drop cable having its first end pre-connectorized) is provided to the operator responsible of performing the installation in the apartment of the end user.

In the apartment, the operator inserts the free end of the drop cable exiting the optical termination box into a duct connecting the apartment to an optical transition box located on the same building floor (or to a distribution cabinet) and fixes the optical termination box to a support structure using the fixing element accessible from the outside, without opening the optical termination box. Then, the operator leaves the apartment, reaches the optical transition box (or the distribution cabinet), and connects the drop cable to the riser cable within the optical transition box (or to the distribution cabinet).

Advantageously, the number of steps performed by the operator within the apartment of the end user is reduced. Since the drop cable is pre-connectorized, the operator merely has to fix the optical termination box to the support structure, and does not have to make optical fiber splices and arrange optical fibers, optical fiber splices and optical connectors in the optical termination box while he is in the apartment of the end user. Accordingly, the installation of the optical termination box in the apartment of the end user can be completed in a very short time, and is then less inconvenient for the end user.

Further, the risk that the operator damages the content of the optical termination box during installation is advantageously minimized.

Indeed, handling of optical fiber splices, optical fibers and optical connectors by the operator is advantageously avoided. Further, the operator does not have to open the optical termination box for fixing it to the support structure. Then, the operator is prevented from damaging the content of the box while he performs this operation. Further, possible dust and/or wall fragments produced while the operator performs installation can not enter the optical termination box, and accordingly can not damage its content.

Besides, that fact that the steps of making optical fiber splices and arranging optical fiber splices, optical fibers and optical connectors are performed by the manufacturer that assembles the optical termination assembly advantageously provides an improved control of these steps. Indeed, these steps may be performed in a controlled environment (e.g. controlled temperature/humidity, controlled pollution level, etc.) by specialized staff at the manufacturer's premises. The optical performance of the optical termination box (e.g. the optical fiber splice losses, the bending losses, etc.) may be therefore optimized, while the risk that an optical termination box having degraded optical performance is installed in the apartment of an end user is advantageously minimized.

According to a first aspect, the present invention provides an optical termination assembly comprising an optical termination box and a drop cable, the drop cable having a first end housed in a first compartment of the optical termination box, the optical termination assembly being characterized in that the first end of the drop cable is pre-connectorized and in that the optical termination box comprises at least one first fixing element accessible from the outside and suitable for fixing the optical termination box to a support structure.

In this manner the optical termination box can be mounted without opening the first compartment.

Preferably, the optical termination box has a base with a bottom and four sidewalls, the bottom having a first surface and a second surface opposite to the first surface, the first surface forming the first compartment with the four sidewalls, and the second surface forming a second compartment with the four sidewalls, the bottom comprising an opening suitable for allowing the drop cable passing from the second compartment to the first compartment where the first pre-connectorized end is housed.

Preferably, at least one of the four sidewalls comprises a weakening line defining a removable portion, the weakening line being configured so that, when the removable portion is removed, a passageway is created in the at least one of the four sidewalls between the second compartment and an exterior of the base.

Preferably, the second surface has a cable guiding channel configured to guide the drop cable from the opening to the removable portion.

Preferably, the at least one first fixing element is arranged on the second surface.

Preferably, the optical termination box comprises a number of first fixing elements arranged according to a rotational symmetry about a barycenter of said bottom.

Preferably, the optical termination assembly further comprises an adapter having at least one second fixing element configured to engage with the at least one fixing element for fixing the optical termination box to the adapter.

Preferably, the at least one first fixing element comprises a projection having a recess and the at least one second fixing element comprises a protrusion terminating with a tooth, the protrusion being configured to engage with the recess.

Preferably, the adapter comprises:
at least one adapter fixing hole suitable for fixing the adapter to a portion of a wall acting as the support structure; and/or
at least one adapter fixing groove configured to engage with a DIN rail for fixing the adapter to the DIN rail acting as the support structure.

Preferably, the drop cable comprises a number of optical fibers, the number of optical fibers being connected to a corresponding number of optical connectors at the first end of the drop cable.

Preferably, one of the four sidewalls comprises a number of connector supporting frames configured to support the number of optical connectors in the first compartment.

Preferably, the optical termination box further comprises a splice tray rotatably hinged to the base and configured to rotate between a first position in which it at least partially covers the first compartment and a second position in which it allows free access to the first compartment, the splice tray being suitable for housing a number of optical fiber splices between the number of optical fibers and the corresponding number of optical connectors.

According to a second aspect, the present invention provides a method for installing, in an apartment of an end user, an optical termination assembly comprising an optical termination box and a drop cable, the drop cable having a first end housed in a first compartment of the optical termination box, the first end of the drop cable being pre-connectorized, the method comprising the following steps:
a) inserting a free end of the drop cable into an opening of a duct connecting the apartment to one of an optical transition box and a distribution cabinet of an optical access network; and
b) fixing the optical termination assembly to a support structure within the apartment
Preferably, step b) comprises:
fixing an adapter to the support structure; and
connecting the optical termination box to the adapter.

BRIEF DESCRIPTION OF THE DRAWINGS

The present invention will become fully clear by reading the following detailed description, to be read by referring to the accompanying drawings, wherein.

DETAILED DESCRIPTION OF PREFERRED EMBODIMENTS OF THE INVENTION

The Figures (that are not in scale) show an optical termination assembly 1 as assembled and sold by a manufacturer, i.e. before installation in an apartment of an end user.

The optical termination assembly 1 comprises an optical termination box 2 and a drop cable 3. The optical termination box 2 comprises a base 4, a cover 5 and optionally a splice tray 6.

The base 4 comprises a bottom 4e and four sidewalls 4a, 4b, 4c, 4d. The bottom 4e is substantially rectangular. The sidewalls 4a, 4b, 4c, 4d are substantially perpendicular to the bottom 4e. The bottom 4e has a first surface 40e facing the cover 5 and the splice tray 6 and a second surface 41e opposite to the first surface 40e. The bottom 4e is positioned so that its first surface 40e forms a first compartment together with the four sidewalls 4a, 4b, 4c, 4d, while its second surface 41e forms a second compartment together with the four sidewalls 4a, 4b, 4c, 4d. The first compartment is visible in FIG. 2, while the second compartment is visible in FIG. 4. The bottom 4e further comprises an opening 42e (see FIG. 4).

The base length in a typical embodiment is about 110 mm, while the base width is about 90 mm and the base thickness is about 25 mm.

Each of the four sidewalls 4a, 4b, 4c, 4d comprises at least one weakening line defining a removable portion 40a, 40b, 40c, 40d of the sidewall 4a, 4b, 4c, 4d, respectively. Each weakening line is such that, when the corresponding removable portion 40a, 40b, 40c, 40d is removed (e.g. by pressing it with a finger tip or a tool), a passageway is created in the sidewall 4a, 4b, 4c, 4d between the second compartment of the base 4 and the exterior of the base 4. The weakening lines are preferably "U" shaped.

Further, a sidewall 4a comprises a number of additional weakening lines defining a corresponding number of additional removable portions of the sidewall 4a. By way of example, in the optical termination assembly 1 shown in the Figures, the sidewall 4a comprises two additional weakening lines defining two removable portions 42a of the sidewall 4a. Preferably, each additional weakening line is such that, when the corresponding removable portion 42a is removed (e.g. by pressing it with a finger tip or a tool), a passageway is created in the sidewall 4a between the first compartment of the base 4 and the exterior of the base 4. The additional weakening lines are preferably "U" shaped. At each additional removable portion 42a, the sidewall 4a preferably has retaining tabs 402a protruding in the first compartment of the base 4, and suitable for retaining an optical cable entering the first compartment through the passageways created when the additional removable portion 42a are removed.

The sidewall 4a of the base 4 comprises a number of connector supporting frames 41a. By way of non-limiting example, the sidewall 4a of the optical termination box 2 shown in the Figures comprises four connector supporting frames 41a. Each connector supporting frame 41a is configured to support an optical connector housed in the first compartment of the base 4 so that it may be accessed from the exterior of the optical termination box 2. To this purpose, each connector supporting frame 41a has an opening (not visible in the Figures) and a suitable threaded supporting member or snap supporting member configured to engage with the optical connector. Further, each connector supporting frame 41a is provided with a respective door suitable for closing its opening so that it blocks possible light emitted by the optical connector when no end user equipment is connected to it.

The first surface 40e of the bottom 4e has a number of guiding protrusions 46e suitable for allowing arranging the optical fibers of the drop cable 3 in the first compartment of the base 4. The guiding protrusions 46e are curved with a bending radius higher than or equal to a minimum predefined bending radius. The predefined minimum bending radius depends on the type of optical fibers comprised in the drop cable 3, and is equal to about 20 mm. The guiding protrusions 46e are provided with retaining tabs.

Figure 4:
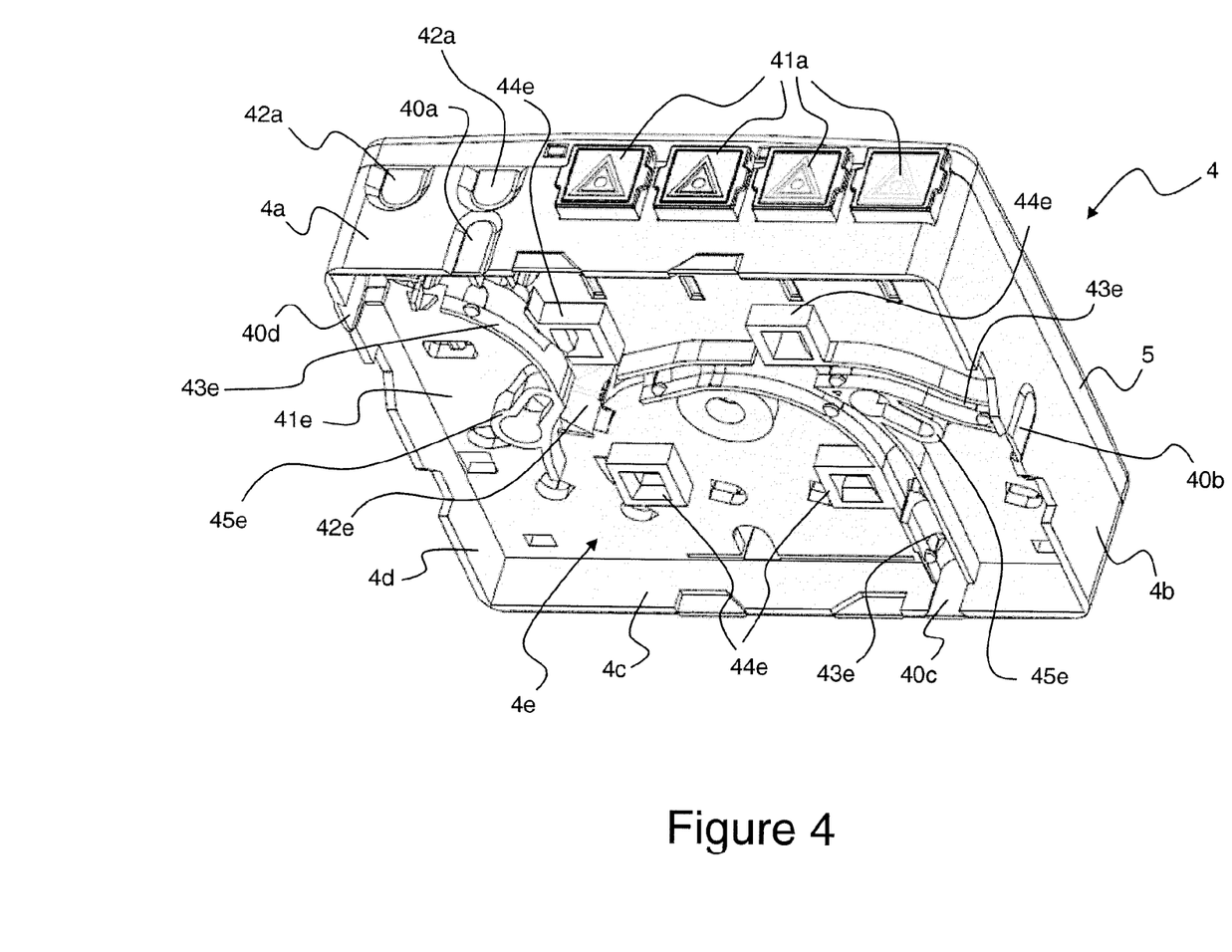
FIG. 4 is a perspective bottom view of the optical termination box of FIG. 1.

The second surface 41e of the bottom 4e has a number of cable guiding channels 43e (see FIG. 4). Each cable guiding channel 43e substantially connects the opening 42e of the bottom 4e to a respective removable portion 40a, 40b, 40c, 40d. Each cable guiding channel 43e may have straight portions and/or curved portions. The curved portions have a bending radius higher than or equal to the above mentioned minimum predefined bending radius.

The second surface 41e of the bottom 4e has a number of first fixing elements 44e accessible from the outside and configured to cooperate with corresponding second fixing elements of an adapter for fixing the base 4 to the adapter, as it will be discussed in further detail herein after. Preferably, the second surface 41e of the bottom 4e has four first fixing elements 44e. The four first fixing elements 44e are preferably arranged at the vertexes of a square whose barycentre substantially corresponds to the barycentre of the bottom 4e. Each first fixing element 44e preferably comprises a projection having a recess. The recess is preferably squared.

Optionally, the bottom 4e may have at least one (for instance two, as shown in FIG. 4) additional fixing elements 45e that are suitable for allowing an operator fixing the base 4 to a portion of a wall of an apartment of an end user by means of screws or other threaded elements, as it will be described in detail herein after.

Preferably, the base 4 has cover locking tabs (not visible in the drawings) for allowing the cover 5 to be locked to the base 4.

Figure 3:
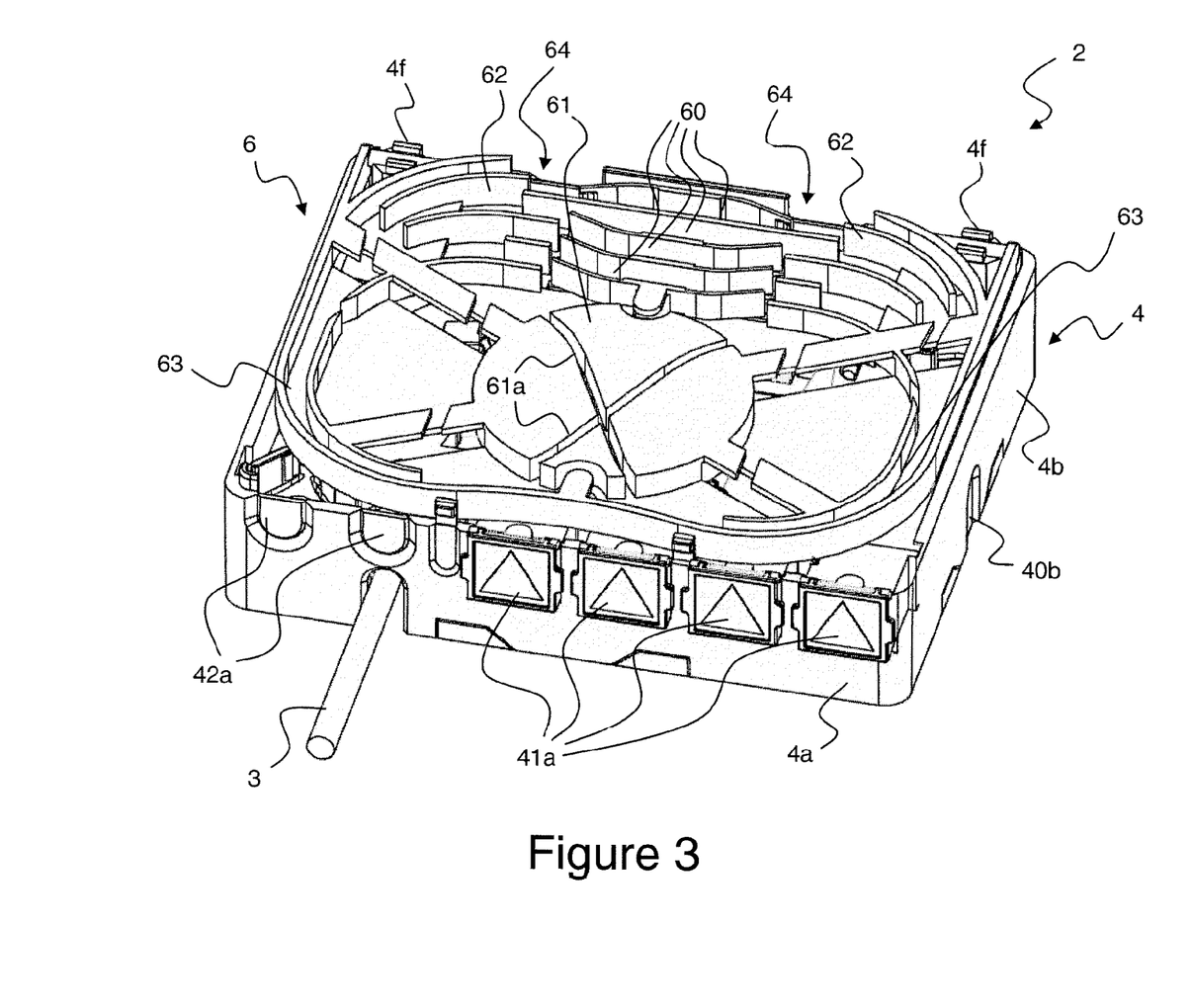
FIG. 3 is a perspective view of the optical termination assembly of FIG. 1, when the base is partially covered by the splice tray.

Preferably, the base 4 has two hinges 4f configured to fix the splice tray 6 to the base 4 (as shown in FIG. 3) and to allow the splice tray 6 rotating between a first position in which it at least partially covers the first compartment of the base 4, and a second position in which it allows free access to the first compartment of the base 4.

The base 4 is made of a single piece of injection moulded thermoplastic material. More preferably, the base 4 is made from an ABS (Acrylonitrile Butadiene Styrene) polymer.

The cover 5 comprises locking tabs (not visible in the drawings) suitable for engaging with the cover locking tabs of the base 4 for allowing the cover 5 to be locked to the base 4. Preferably, the cover 5 is made of a single piece of injection moulded thermoplastic material. More preferably, the cover 5 is made from an ABS polymer.

In a typical embodiment, the thickness of the cover 5 is about 10 mm. When the cover 5 is locked onto the base 4, the total height of the optical termination box 2 is then about 35 mm.

The splice tray 6 has a substantially rectangular shape with rounded corners. The splice tray 6 preferably has a number of splice holders 60 (by way of example, four splice holders in FIG. 3). Further, the splice tray 6 preferably comprises a fiber winding element 61. The fiber winding element 61 has a cylindrical body whose radius is preferably higher than the above mentioned predefined minimum bending radius. The fiber winding element 61 further comprises at least one fiber passageway 61a that obliquely cuts its cylindrical body. The splice tray 6 further comprises a number of fiber guiding elements 62 adjacent to the splice holders 60 on both sides thereof and a fiber guiding channel 63 that runs close to the periphery of the splice tray 6 partially enclosing the fiber winding element 61. Both the fiber guiding elements 62 and the fiber guiding channel 63 may have straight portions and/or curved portions. The curved portions have the above mentioned predefined minimum bending radius. The splice tray 6 comprises openings 64 located between the splice holders 60 and the fiber guiding elements 62.

Preferably, the splice tray 6 is made of a single piece of injection moulded thermoplastic material. More preferably, the splice tray 6 is made from an ABS polymer.

Figure 1:
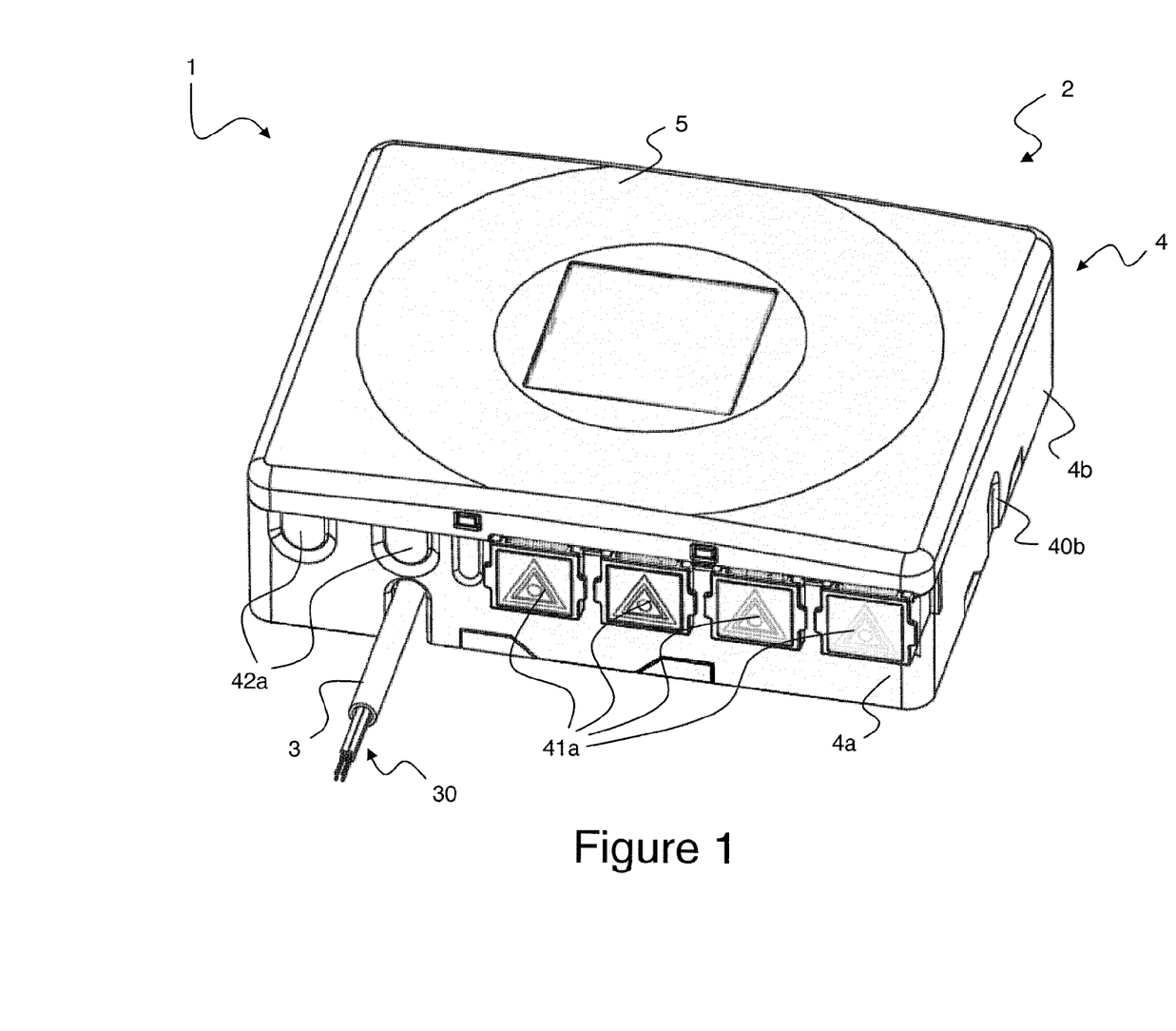
FIG. 1 is a perspective view of an optical termination assembly comprising an optical termination box and a drop cable, according to an embodiment of the present invention.

The drop cable 3 comprises a number of optical fibers 30, for instance four optical fibers (visible in FIG. 1) A first end of the drop cable 3 is housed in the optical termination box 1. In particular, a first end of the drop cable 3 is housed in the first compartment of the base 4. The drop cable 4 preferably exits the first compartment of the base 4 through the opening 42e of the bottom 4e.

The first end of the drop cable 3 housed within the first compartment of the base 4 is connectorized, i.e. within the first compartment of the base 4 the external sheath of the drop cable 3 is removed for a given length thus exposing the optical fibers 30, and at least one of the optical fibers 30 is connected to an optical connector 31. Each optical fiber 30 of the drop cable 3 is connected to a respective optical connector 31. Each optical fiber 30 of the drop cable 3 may be connected to a respective pig-tailed optical connector 31 (i.e. an optical connector assembled with a fiber optic pig-tail having an end inserted in the optical connector) by means of a respective optical fiber splice.

Figure 2:
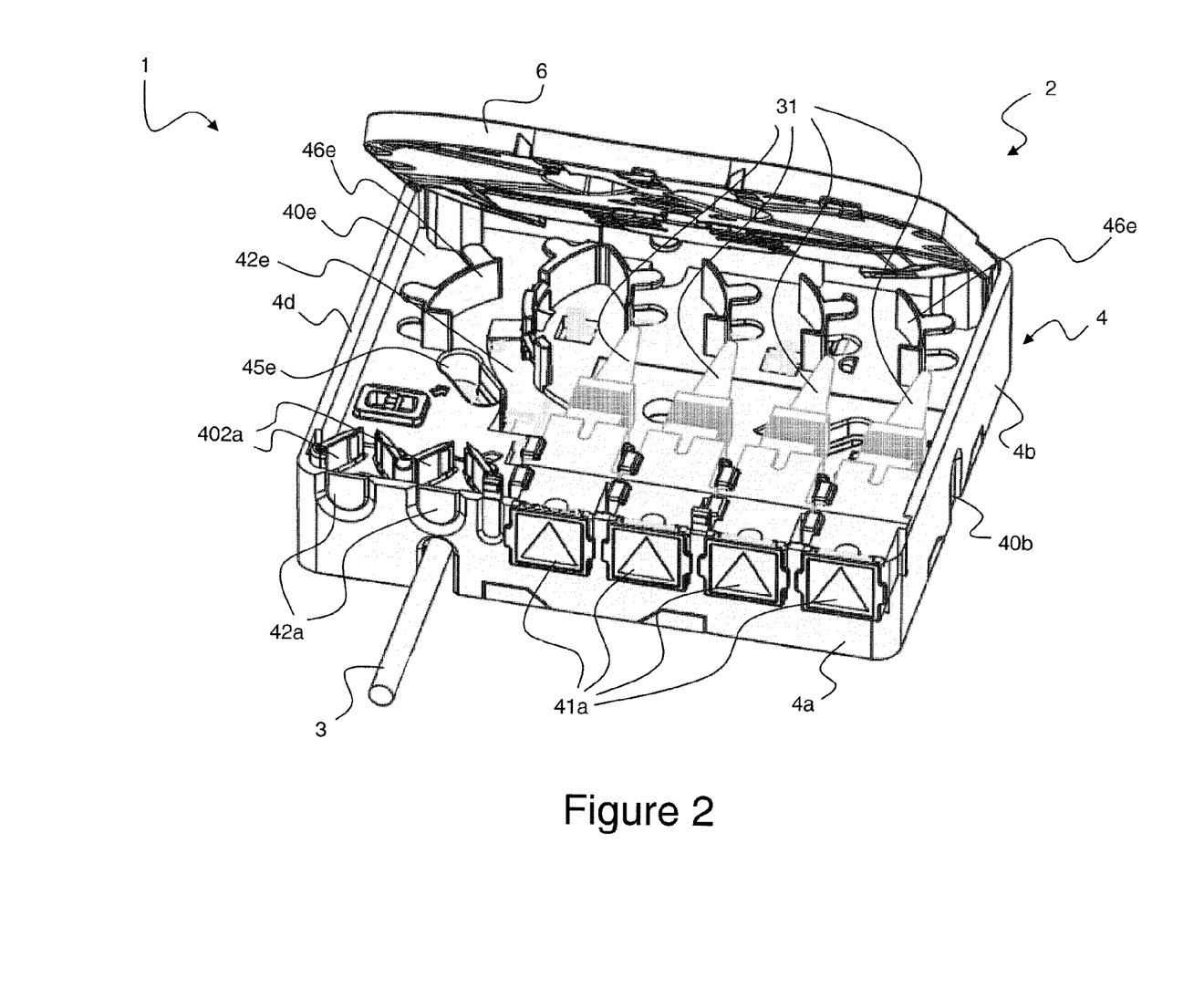
FIG. 2 is a perspective view of the optical termination assembly of FIG. 1, when the splice tray allows free access to the base.

The optical connectors 31 may be of the type SC, FC, or the like. In FIG. 2, by way of example, the optical connectors 31 are of the type SC. The optical fiber splices may be either fusion splices or mechanical splices between the optical fibers 30 and the pig-tails of the pig-tailed optical connectors 31. According to an alternative embodiment, instead of connecting each optical fiber 30 to a respective pig-tailed optical connector 31, the end of each optical fiber 30 is directly inserted into a respective optical connector.

Preferably, at the first end of the drop cable 3, the optical fibers 30 exit the external sheath of the drop cable 3 within the first compartment of the base 4, and preferably pass through one of the openings 64 so that they lie onto the splice tray 6. On the splice tray 6, a possible extra-length of the optical fibers 31 is preferably wound around the fiber winding element 61, and the optical fiber splices are housed in the splice holders 60. Possible extra-length of the pig-tails of the pig-tailed optical connectors 31 is preferably also wound around the fiber winding element 61. The pig-tails then pass through one of the openings 64, so that the pig-tailed optical connectors 31 are housed in the first compartment of the base 4. In the first compartment of the base 4, each optical connector 31 is supported by a respective connector supporting frame 41a.

According to the above mentioned embodiment (not shown in the drawings) wherein the end of each optical fiber 30 is directly inserted into a respective optical connector, the optical termination box 2 may not comprise the splice tray 6, and the extra-length of the optical fibers 30 between the external sheath of the drop cable 3 and the optical connectors may be arranged on the first surface 40e of the bottom 4e within the first compartment of the base 4.

According to a particularly preferred embodiment of the present invention, the optical termination assembly 1 comprises, in addition to the optical termination box 2 and the drop cable 3, an adapter 7.

Figure 5:
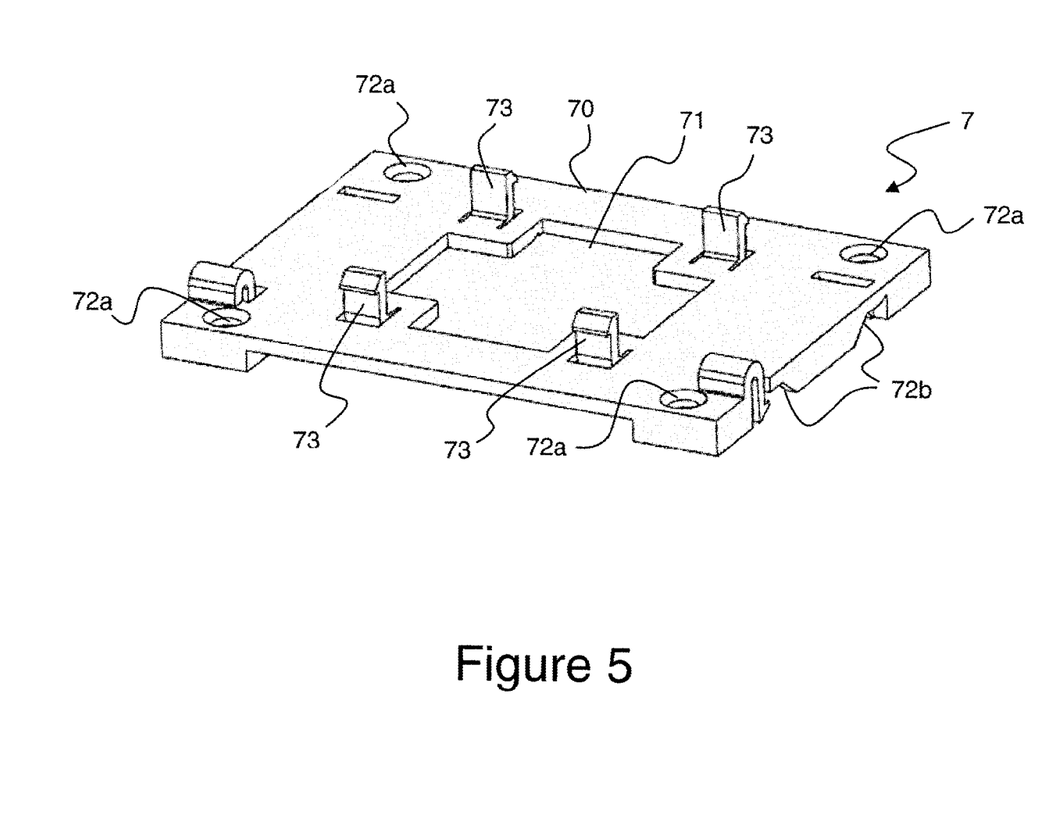
FIG. 5 is a perspective view of an adapter comprised in the optical termination assembly of FIG. 1.

As shown in FIG. 5, the adapter 7 comprises a plate 70 having a substantially rectangular shape. The size of the plate 70 is smaller than the size of the base 4 of the optical termination box 2. In particular, the plate 70 has length equal to about 85 mm and a width preferably equal to about 70 mm.

The plate 70 has a central opening 71. The central opening 71 is preferably cross-shaped, as shown in FIG. 5. Further, the plate 70 has adapter fixing holes 72a located at its corners, that are suitable for allowing an operator to fix the adapter 7 to a portion of a wall of an apartment of an end user by means of screws or other threaded elements, as it will be described in detail herein after. Further, one of the surfaces of the plate 70 is provided with adapter fixing grooves 72b configured to engage with a standardized support structure, such as for instance a DIN rail.

Further, the adapter 7 preferably has a number of second fixing elements 73 configured to cooperate with the above described first fixing elements 44e of the base 4, for fixing the base 4 to the adapter 7. More preferably, the adapter 7 has four second fixing elements 73 arranged on the plate 70. In particular, the four second fixing elements 73 are arranged on the surface of the plate 70 opposite to that having the adapter fixing grooves 72b. The four second fixing elements 73 are arranged at the vertexes of a square substantially enclosing the central opening 71 of the plate 70. Each second fixing element 73 comprises a protrusion extending substantially perpendicularly to the plate 70, the protrusion terminating with a tooth.

The operation of connectorizing the first end of the drop cable 3 as described above (together with the related operations, such as: inserting the first end of the drop cable 3 in the first compartment of the base 4 before connectorizing it, and arranging the optical fibers 30, the optical connectors 31 and the possible optical fiber splices in the optical termination box 2 after connectorization) are performed by the manufacturer that assemblies the optical termination assembly 1. In other words, the first end of drop cable 3 is pre-connectorized. After connectorization, the manufacturer locks the cover 5 onto the base 4. The manufacturer seals the cover 5 onto the base 4, so as to prevent operators and/or end users from opening the optical termination box 2.

The optical termination assembly 1 shown in the Figures is then provided to an operator responsible of installing it in the apartment of an end user.

For installing the optical termination assembly 1, first of all the operator selects in the apartment a support structure to which the optical termination assembly 1 (and, in particular, the adapter 7) shall be fixed. Such a support structure may be a portion of a wall of the apartment. Alternatively, the support structure may be a standardized support structure possibly already available in the apartment. An exemplary standardized support structure may be a portion of a DIN rail already installed in the apartment for supporting a circuit breaker.

The support structure is preferably located at or in the proximity of an opening of a duct connecting the apartment of the end user with an optical transition box located at the same floor as the apartment, or with a distribution cabinet located in the basement of the building.

In case the operator decides to fix the optical termination assembly 1 to a portion of a wall, he drills in that portion of wall a number of holes whose arrangement corresponds to the arrangement of the adapter fixing holes 72a of the adapter 7. The drilled holes may enclose the opening of the duct so that, when the adapter 7 is fixed to the wall portion, the opening of the duct is accessible through the central opening 71 of the adapter 7. Alternatively, the drilled holes may be arranged so that, when the adapter 7 is fixed to the wall portion, the opening of the duct is located besides the adapter 7. Then, the operator fixes the adapter 7 to the selected portion of wall by inserting screws or other threaded elements in the adapter fixing holes 72a and screwing them in the drilled holes of the wall. The second fixing elements 73 of the adapter 7 protrude from the adapter 7 facing away from the wall.

In case the operator decides to fix the optical termination assembly 1 to a portion of a DIN rail, the operator presses the adapter 7 against the portion of the DIN rail, until the adapter fixing grooves 72b engage with the protrusions of the DIN rail. The second fixing elements 73 of the adapter 7 protrude from the adapter 7 facing away from the DIN rail.

The operator then inserts the free end of the drop cable 3 in the opening of the duct, and draws it towards the optical transition box or the distribution cabinet by means of a device suitable for laying cables in ducts.

Then, if the opening of the duct is accessible through the central opening 71 of the adapter 7, the operator preferably arranges the extra-length of the drop cable 3 in the second compartment of the base 4, and then connects the optical termination box 2 with the pre-connectorized drop cable 3 to the adapter 7. In this case, the opening of the duct is therefore located behind the optical termination box 2.

Otherwise, if the opening of the duct is located besides the adapter 7, the operator removes from the base 4 (by pressing it with a finger tip or a tool) one of the removable portions 40a, 40b, 40c, 40d thereby creating a passageway in one of the sidewalls 4a, 4b, 4c, 4d, arranges an extra-length of the drop cable 3 in the second compartment of the base 4, arranges the drop cable 3 in the passageway created in one of the sidewalls 4a, 4b, 4c, 4d by removing the corresponding removable portion 40a, 40b, 40c, 40d, and then connects the optical termination box 2 with the pre-connectorized drop cable 3 to the adapter 7. The passageway advantageously allows the drop cable 3 running from the second compartment of the base 4 to the opening of the duct passing through one of the sidewalls of the base 4. By way of example, in FIGS. 1-3, the removable portion 40a of the sidewall 4a is removed, and the drop cable 3 is passed through the corresponding passageway in the sidewall 4a.

For connecting the optical termination box 2 with the pre-connectorized drop cable 3 to the adapter 7, the operator brings the second surface 41e of the bottom 4e of the base 4 close to the adapter 7, so that the first fixing elements 44e of the bottom 4e are aligned with the second fixing elements 73. Then, the operator pushes the optical termination box 2 against the adapter 7. In this way, the protrusion of each second fixing element 73 enters the recess of a corresponding first fixing element 44e, until its tooth engages with an edge of the projection defining the recess. The tooth advantageously prevents the optical termination box 2 and the adapter 7 from detaching each other.

When the optical termination box 2 is connected to the adapter 7, the optical termination box 2 rests against the plate 70 so that the plate 70 closes the second compartment of the base 4. Then, advantageously, the extra-length of the drop cable 3 arranged therein can not escape from the second compartment of the base 4.

Advantageously, the orientation of the optical termination box 2 is independent of the orientation of the adapter 7. Therefore, the operator may first fix the adapter 7 to the support structure, and then decide whether to connect the optical termination box 2 horizontally oriented or vertically oriented. This is advantageously due to the fact that the first fixing elements 44e and the second fixing elements 73 are positioned according to a squared arrangement, i.e. an arrangement having a rotational symmetry with a rotation angle of 90°. Then, the first fixing elements 44e still engage with the second fixing elements 73 if the optical termination box 2 is rotated by 90° relative to the adapter 7. This feature is particularly advantageous when the support structure is a DIN rail, since in that case the orientation of the adapter 7 can not be freely chosen by the operator, but is uniquely determined by the orientation of the DIN rail, which is typically horizontal.

According to variants not shown in the drawings, the optical termination assembly does not comprise the adapter 7. According to these variants, the first fixing elements of the base 4 are configured to allow the operator fixing the optical termination assembly directly to the selected support structure. For instance, each first fixing element may comprise a buttonhole arranged on the external surface of one of the four sidewalls 4a, 4b, 4c, 4d. The operator may fix the optical termination assembly 1 to a support structure (e.g. a portion of a wall) by drilling a suitable number of holes in the wall, by inserting screws or other threaded elements in the buttonholes and screwing them in the drilled holes of the wall. In this case, since the optical termination box 2 rests against the wall, the wall itself closes the second compartment of the base 4 so that the extra-length of the drop cable 3 can not escape from the second compartment of the base 4.

After the optical termination box 2 has been fixed to the support structure, the operator goes to the optical transition box and optically connects the drop cable 3 to the riser cable. Otherwise, if the FTTH network installed in the building does not comprise the riser cable and the optical transition boxes, the operator goes to the basement of the building and optically connects the drop cable 3 to the distribution cabinet.

The installation is then completed. The end user may then open one of the doors of the connector supporting frames 41a thus accessing the optical connector 31 supported therein, and connects an end user equipment to such an optical connector.

Therefore, advantageously, the number of steps performed by the operator within the apartment of the end user is reduced. Since the drop cable is pre-connectorized, the operator merely has to fix the optical termination box to the support structure, and does not have to make optical fiber splices and arrange optical fibers, optical fiber splices and optical connectors in the optical termination box while he is in the apartment of the end user. Accordingly, the installation of the optical termination box in the apartment of the end user can be completed in a very short time, and is then less inconvenient for the end user.

Further, advantageously, the critical steps of making optical fiber splices and handling optical fiber splices, optical fibers and optical connectors for arranging them in the optical termination box are advantageously avoided during installation in the apartment.

Besides, that fact that these critical steps are performed by the manufacturer that assemblies the optical termination assembly advantageously provides an improved control of these steps. Indeed, these steps may be performed in a controlled environment (e.g. controlled temperature/humidity, controlled pollution level, etc.) by specialized staff at the manufacturer's premises. The optical performance of the optical termination box (e.g. the splice losses, the bending losses, etc.) may be therefore optimized, while the risk that an optical termination box having degraded optical performance is installed in the apartment of an end user is advantageously minimized.

Further, the risk that the operator damages the content of the optical termination box while he fixes the optical termination box to the support structure is advantageously avoided, since this operation is performed while the optical termination box is closed. Therefore, the operator can not inadvertently break a splice or pierce an optical fiber while he performs these operations. Further, dust and/or wall fragments produced while the operator performs this operation can not enter into the optical termination box.

It can be noticed that, although the optical termination box 2 described above is assembled with the pre-connectorized drop cable 3 (and may therefore be fixed to a support structure without being opened using the first fixing elements 44e), the optical termination box 2 may also be used in combination with a non pre-connectorized drop cable. In this case, the installation of the optical termination box 2 and the non pre-connectorized drop cable is similar to the known installation procedure described above. In particular, the base 4 of the optical termination box 2 may be fixed to a support structure using the additional fixing elements 45e provided on the bottom 4e thereof. Then, an end of the non pre-connectorized drop cable is drawn from the optical transition box (or from the distribution cabinet) to the apartment of the end user. Then, the operator may cut the drop cable to a suitable length and connectorize its end (e.g. making one or more optical fiber splices). Then, the operator may remove one of the additional removable portions 42a of the sidewall 4a of the base 4 thereby creating a passageway in the sidewall 4a, and insert the connectorized end of the drop cable in the first compartment of the base 4 through the passageway. The operator may finally arrange the optical fibers of the drop cable with their connectors in the first compartment of the base 4, fix the optical connectors to the connector support frames 41a and lock the cover 5 onto the base 4.

The invention claimed is:

1. An optical termination assembly, comprising:
an optical termination box; and
an optical drop cable;
wherein the optical drop cable has a first pre-connectorized end, housed in a first compartment of the optical termination box, and a free end, opposite to the first pre-connectorized end, exiting the optical termination box,
wherein the optical termination box comprises:
a second compartment suitable for housing an extra length of the optical drop cable; and
at least one first fixing element within the optical termination box and accessible from the second compartment;
wherein the optical termination assembly further comprises an adapter having at least one second fixing element configured to engage with the at least one first fixing element for fixing the optical termination box to the adapter so that the adapter closes the second compartment,
wherein the adapter is further suitable for being fixed to a support structure,
wherein the optical termination box comprises a base with a bottom and four sidewalls,
wherein the bottom has a first surface and a second surface opposite to the first surface,
wherein the first surface forms the first compartment with the four sidewalls,
wherein the second surface forms the second compartment with the four sidewalls,
wherein the bottom comprises an opening configured to allow the optical drop cable to pass from the second compartment to the first compartment where the first pre-connectorized end is housed, and
wherein the optical termination box further comprises a plurality of first fixing elements arranged according to a rotational symmetry about an axis perpendicular to the bottom and running through a barycenter of the bottom.

2. The optical termination assembly of claim 1, wherein at least one of the four sidewalls comprises a weakening line defining a removable portion, and
wherein the weakening line is configured so that, when the removable portion is removed, a passageway is created in the at least one of the four sidewalls between the second compartment and an exterior of the base.

3. The optical termination assembly of claim 2, wherein the second surface has a cable guiding channel configured to guide the optical drop cable from the opening to the removable portion.

4. The optical termination assembly of claim 1, wherein the at least one first fixing element is arranged on the second surface.

5. The optical termination assembly of claim 1, wherein the at least one first fixing element comprises a projection having a recess,
wherein the at least one second fixing element comprises a protrusion terminating with a tooth, and
wherein the protrusion is configured to engage with the recess.

6. The optical termination assembly of claim 1, wherein the adapter further comprises:
at least one adapter fixing hole suitable for fixing the adapter to a portion of a wall acting as the support structure; or at least one adapter fixing groove configured to engage with a Deutsches Institut für Normung (DIN) rail for fixing the adapter to the DIN rail acting as the support structure.

7. The optical termination assembly of claim 1, wherein the optical drop cable comprises a number of optical fibers, and
wherein the number of optical fibers are connected to a corresponding number of optical connectors at the first pre-connectorized end of the optical drop cable.

8. The optical termination assembly of claim 7, wherein the optical termination box further comprises a splice tray rotatably hinged to the base of the optical termination box and configured to rotate between a first position, in which the splice tray at least partially covers the first compartment, and a second position, in which the splice tray allows free access to the first compartment, and
wherein the splice tray is suitable for housing a number of optical fiber splices between the number of optical fibers and the corresponding number of optical connectors.

9. The optical termination assembly of claim 1, wherein one of the four sidewalls comprises a number of connector supporting frames configured to support a corresponding number of optical connectors in the first compartment.

10. The optical termination assembly of claim 1, wherein the adapter further comprises:
at least one adapter fixing hole suitable for fixing the adapter to a portion of a wall acting as the support structure; and
at least one adapter fixing groove configured to engage with a Deutsches Institut für Normung (DIN) rail for fixing the adapter to the DIN rail acting as the support structure.

11. A method for installing, in an apartment of an end user, an optical termination assembly comprising an optical termination box; an optical drop cable; and an adapter; wherein the optical termination box comprises a first compartment, a second compartment, a splice tray, and at least one first fixing element, wherein the optical drop cable has a first pre-connectorized end, housed in the first compartment of the optical termination box, and a second end, opposite to the first pre-connectorized end, wherein the at least one first fixing element is configured to be accessed from outside of the optical termination box, wherein the second compartment is configured to house an extra length of the optical drop cable, wherein the adapter comprises at least one second fixing element, wherein the adapter is further suitable for being fixed to a support structure, wherein the at least one second fixing element is configured to engage the at least one first fixing element for fixing the optical termination box to the adapter, wherein the splice tray is rotatable hinged to a base of the optical termination box, and wherein the splice tray is configured to rotate between a first position, in which the splice tray at least partially covers the first compartment, and a second position, in which the splice tray allows free access to the first compartment, the method comprising:
inserting the second end of the optical drop cable into an opening of a duct connecting the apartment to one of an optical transition box and a distribution cabinet of an optical access network; and
fixing the optical termination assembly to the support structure within the apartment;
wherein the first pre-connectorized end of the optical drop cable is both housed in the first compartment of the optical termination box and pre-connectorized before inserting the second end of the optical drop cable into the opening of the duct, and
wherein the fixing of the optical termination assembly to the support structure within the apartment is performed while the optical termination box is closed by the at least one second fixing element, accessed from outside the optical termination box, while a cover of the optical termination box is locked on the base of the optical termination box.

12. The method of claim 11, wherein the fixing of the optical termination assembly to the support structure within the apartment comprises:
fixing the adapter to the support structure; and
connecting the optical termination box to the adapter.

13. An optical termination assembly, comprising:
an optical termination box;
an optical drop cable; and
an adapter;
wherein the optical termination box comprises a first compartment, a second compartment, a splice tray, and at least one first fixing element,
wherein the optical drop cable has a first pre-connectorized end, housed in the first compartment of the optical termination box, and a second end, opposite to the first pre-connectorized end,
wherein the at least one first fixing element is configured to be accessed from outside of the optical termination box,
wherein the second compartment is configured to house an extra length of the optical drop cable,
wherein the adapter comprises at least one second fixing element,
wherein the adapter is further suitable for being fixed to a support structure,
wherein the at least one second fixing element is configured to engage the at least one first fixing element for fixing the optical termination box to the adapter,
wherein the splice tray is rotatably hinged to a base of the optical termination box, and
wherein the splice tray is configured to rotate between a first position, in which the splice tray at least partially covers the first compartment, and a second position, in which the splice tray allows free access to the first compartment.

14. The optical termination assembly of claim 11, wherein the second end of the optical drop cable is outside of the optical termination box.

15. The optical termination assembly of claim 13, wherein a portion of the optical drop cable between the first pre-connectorized end and the second end is outside of the optical termination box.

16. The optical termination assembly of claim 13, wherein when the at least one second fixing element engages the at least one first fixing element for fixing the optical termination box to the adapter, the adapter closes the second compartment.

17. The optical termination assembly of claim 13, wherein when the at least one second fixing element engages the at least one first fixing element for fixing the optical termination box to the adapter, the extra length of the optical drop cable cannot escape from the second compartment.

18. The optical termination assembly of claim 13, wherein the optical termination box further comprises a bottom separating the first compartment from the second compartment, and
wherein the bottom comprises an opening configured to allow the optical drop cable to pass between the first and second compartments.

* * * * *